(12) United States Patent
Kiyono et al.

(10) Patent No.: US 11,550,947 B2
(45) Date of Patent: Jan. 10, 2023

(54) AUTOMATIC PROHIBITION OF PERSONAL INFORMATION IDENTIFICATION (71) Applicant: INTERNATIONAL BUSINESS MACHINES CORPORATION, Armonk, NY (US)

(72) Inventors: Satsuo Kiyono, Yokohama (JP); Eric V. Kline, Pine Island, MN (US); Wen Ming Lim, Singapore (SG); Carlo Gonzales Gagui, Singapore (SG); Chiaki Oishi, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 323 days.

(21) Appl. No.: 16/854,781

(22) Filed: Apr. 21, 2020

(65) Prior Publication Data
US 2021/0326473 A1 Oct. 21, 2021

(51) Int. Cl.
*G06F 21/62* (2013.01)
*G06T 5/00* (2006.01)

(52) U.S. Cl.
CPC .......... *G06F 21/6245* (2013.01); *G06T 5/002* (2013.01); *G06T 2207/30201* (2013.01)

(58) Field of Classification Search
CPC ................ G06F 21/6245; G06T 5/002; G06T 2207/30201
See application file for complete search history.

(56) References Cited

U.S. PATENT DOCUMENTS

| 8,744,143 | B2 | 6/2014 | Chen | |
|---|---|---|---|---|
| 9,380,225 | B2 | 6/2016 | Tiscareno et al. | |
| 2011/0299159 | A1* | 12/2011 | Ohno | H04N 13/341 359/462 |
| 2015/0106288 | A1* | 4/2015 | Holman | G06V 10/40 705/325 |

(Continued)

FOREIGN PATENT DOCUMENTS

JP 2006074211 A 3/2006

OTHER PUBLICATIONS

Jiang, Kunkun, Dandan Xu, Zhongyang Liu, Weiwei Zhao, Hongjun Ji, Jiaheng Zhang, Mingyu Li, Tingting Zheng, and Huanhuan Feng. "An invisible private 2D barcode design and implementation with tunable fluorescent nanoparticles." RSC Advances 9, No. 64 (2019): 37292-37299.*

(Continued)

*Primary Examiner* — Sarah Lhymn
(74) *Attorney, Agent, or Firm* — Tihon Poltavets (57) ABSTRACT

A method of prohibiting personal information identification of a photographic subject including: digitally photographing the photographic subject to form a photo of the photographic subject, the photographic subject having an indicia incorporated in the photo indicating prohibiting personal information identification of the photographic subject, the indicia being invisible to the human eye; reading the indicia; responsive to reading the indicia, processing the indicia to make a determination when the indicia prohibits identification of personal information of the photographic subject; and (Continued)

disclosing on a social network system the photo and the personal information of the photographic subject according to the determination.

20 Claims, 6 Drawing Sheets

(56) References Cited

U.S. PATENT DOCUMENTS

| | | | | |
|---|---|---|---|---|
| 2015/0106947 | A1* | 4/2015 | Holman | G06F 21/6245 726/26 |
| 2015/0371054 | A1* | 12/2015 | Wu | G02B 30/25 726/28 |
| 2018/0132340 | A1* | 5/2018 | Correa | F21S 41/645 |
| 2019/0362516 | A1* | 11/2019 | Suzuki | G06T 7/74 |
| 2021/0326473 | A1* | 10/2021 | Kiyono | G06F 21/6245 |

OTHER PUBLICATIONS

Zarepour, Eisa, Mohammadreza Hosseini, Salil S. Kanhere, Arcot Sowmya, and Hamid R. Rabiee. "Applications and challenges of wearable visual lifeloggers." Computer 50, No. 3 (2017): 60-69.*

Häkkilä, J., Colley, A., Roinesalo, P., & Väyrynen, J. (Nov. 2017). Clothing integrated augmented reality markers. In Proceedings of the 16th International Conference on Mobile and Ubiquitous Multimedia (pp. 113-121).*

Schaub, F., Balebako, R., Durity, A. L., & Cranor, L. F. (2015). A design space for effective privacy notices. In Eleventh symposium on usable privacy and security (SOUPS 2015) (pp. 1-17).*

Baldini, G., Fovino, I. N., Satta, R., Tsois, A., & Checchi, E. (2015). Survey of techniques for the fight against counterfeit goods and Intellectual Property Rights (IPR) infringement. Publ Off Eur Union, 1-130.*

Khai N. Truong et al., "Preventing Camera Recording by Designing a Capture-Resistant Environment", UbiComp 2005: Ubiquitous Computing, 7th International Conference, Sep. 2005, all pages.

Kaveh Waddell, "What If Cameras Stopped Telling the Truth", downloaded Jan. 9, 2020. https://www.theatlantic.com/technology/archive/2016/07/what-if-cameras-stopped-telling-the-truth/491150/, Jul. 13, 2016, all pages.

"How do I turn tag suggestions on or off for photos of me on Facebook?", downloaded Jan. 9, 2020, https://www.facebook.com/help/218540514842030, all pages.

"Provide a Way for People To Specify How Their Photos Are Used in Social Networks", IP.com/ IPCOM000232395D, Nov. 5, 2013, all pages.

Merve Alanyali et al., "Tracking Protests Using Geotagged Flickr Photographs", Data Science Lab, Behavioural Science, Warwick Business School, University of Warwick, Coventry, CV4 7AL, United Kingdom, PLoS ONE 11(3), Mar. 1, 2016, all pages.

Cheng Bo et al., "Privacy.Tag: Privacy Concern Expressed and Respected", Nov. 3, 2014, all pages.

Kate Greene, "Lights, Camera—Jamming", MIT Technology Review, Jun. 22, 2006, all pages.

Jeremy Hsu, "LiShield Can Block Smartphone Cameras for Privacy's Sake", IEEE Spectrum, Oct. 17, 2017, all pages.

* cited by examiner

AUTOMATIC PROHIBITION OF PERSONAL INFORMATION IDENTIFICATION

BACKGROUND

The present exemplary embodiments pertain to photographers taking pictures of others who may not want their picture taken and published. The exemplary embodiments further pertain to a method to automatically alter the faces of the others who don't want their picture taken when their photo is published such as on social network systems (SNS).

It may happen that a person is intentionally or accidentally photographed by a photographer without the person's permission. Such an incident may happen when the person is in a crowd and the person is photographed with everyone else in the crowd. Subsequently, this photograph may be published on SNS. There may be no way to stop the photographer from taking the picture but the person would still like to maintain their privacy.

After the fact, a SNS may agree to take down the photograph but there may be other copies of the photograph circulating on other SNSs. Accordingly, this would not be an effective solution

BRIEF SUMMARY

The various advantages and purposes of the exemplary embodiments as described above and hereafter are achieved by providing, according to an aspect of the exemplary embodiments, a method of prohibiting personal information identification of a photographic subject comprising: digitally photographing the photographic subject to form a photo of the photographic subject, the photographic subject having an indicia incorporated in the photo indicating prohibiting personal information identification of the photographic subject, the indicia being invisible to the human eye; reading the indicia; responsive to reading the indicia, processing the indicia to make a determination when the indicia prohibits identification of personal information of the photographic subject; and disclosing on a social network system the photo and the personal information of the photographic subject according to the determination.

According to another aspect of the exemplary embodiments, there is provided a method of disclosing a photo having an indicia indicating prohibiting personal information identification of the photographic subject comprising: storing the photo with the indicia incorporated in the photo on a social network system, the indicia regulating who can view the photo without alteration, wherein the indicia is invisible to the naked eye; requesting the photo by a user from the social network system; accessing a database to check if user has permission to view the photo; and when the user has permission, the user viewing the photo without alteration and when the user does not have permission, the user viewing the photo with alteration.

According to a further aspect of the exemplary embodiments, there is provided a computer program product for prohibiting personal information identification of a photographic subject, the computer program product comprising a computer readable storage medium having program instructions embodied therewith, wherein the computer readable storage medium is not a transitory signal per se, the program instructions executable by a processor to cause the processor to perform a method comprising: digitally photographing the photographic subject to form a photo of the photographic subject, the photographic subject having an indicia incorporated in the photo indicating prohibiting personal information identification of the photographic subject, the indicia being invisible to the human eye; reading the indicia; responsive to reading the indicia, processing the indicia to make a determination when the indicia prohibits identification of personal information of the photographic subject; and disclosing on a social network system the photo and the personal information of the photographic subject according to the determination.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIGS. 2 to 7 illustrate several examples of the invisible indicia in which:

DETAILED DESCRIPTION

The exemplary embodiments pertain to a method using invisible ink material to protect the identification and facial information of a photographic subject, and a system to recognize and alter personal facial information before sharing photographs on the SNS.

Figure 1:
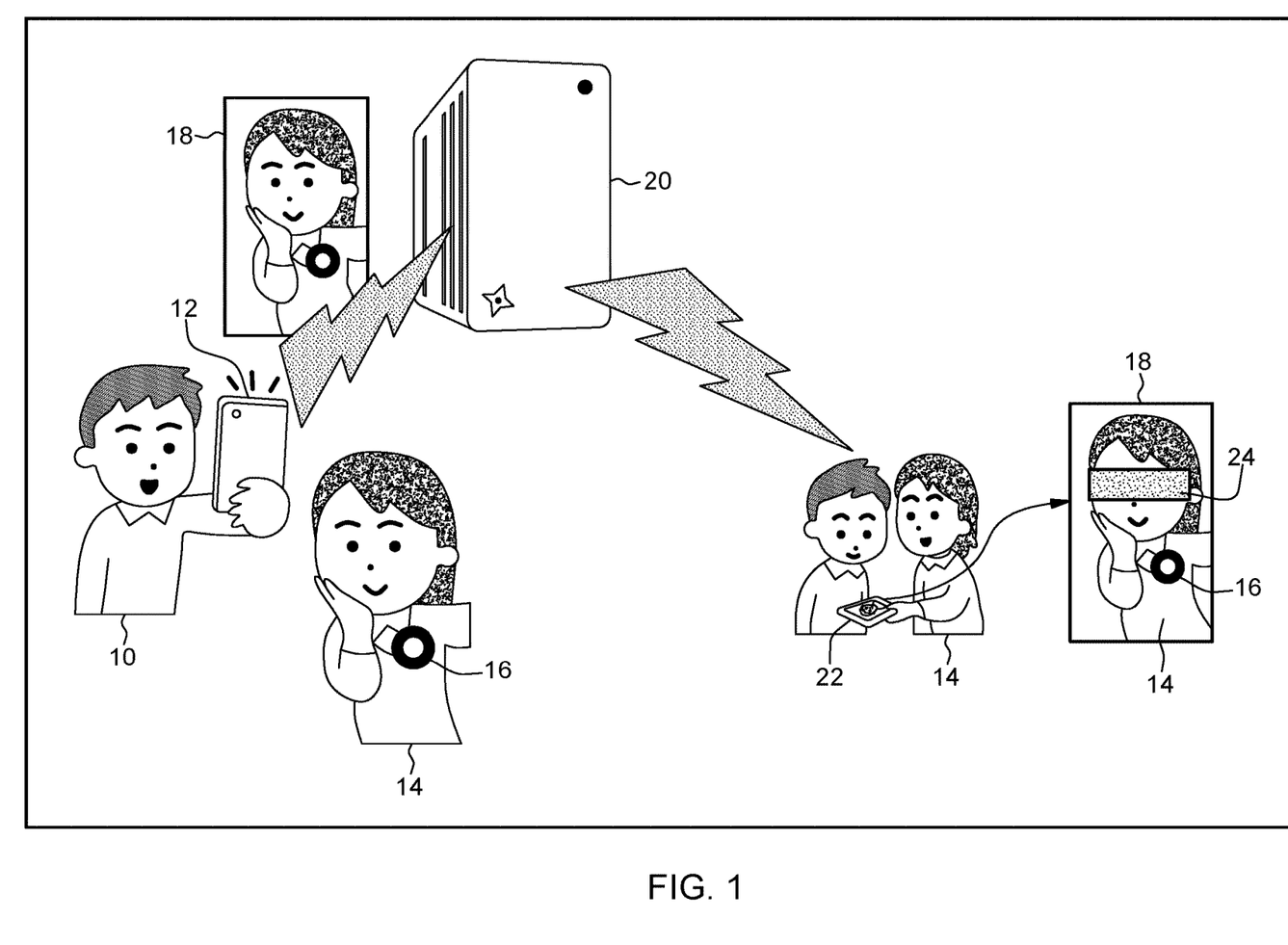
FIG. 1 is an illustration of an exemplary embodiment in which a photo is embedded with invisible indicia to automatically alter the face of a user.

Referring to FIG. 1, there is an illustration of one exemplary embodiment. A photographer 10 having a smartphone 12 is taking a photograph (hereafter photo) 18 of a person 14. The person 14 may be unaware that her photo 18 is being taken and, in any event, has not given permission for her photo 18 to be taken.

Unknown to the photographer 10, the person 14 is wearing a device 16 having invisible indicia (not shown). As will be seen, the device 16 having the invisible indicia will protect the person's privacy by prohibiting the identification of the person 14 and prohibiting the publication of the unaltered face of the person 14 on an SNS.

The photo 18 of the person 14 may be uploaded to a computing system 20. The invisible indicia is embedded in the photo 18.

Subsequently, the photo 18 may be published by an SNS and is viewable on a smartphone 22. However, when the photo 18 is published on the SNS, the invisible indicia prohibits the showing of the facial features of the person 14 so that the facial features of the person 14 are altered. In the photo 18 shown in the smartphone 22, the person's face has been altered by forming a mask 24 over her face to at least partly hide her features.

While a mask 24 has been formed over the face of person 14, the altering of the person's face may be by other methods such as blurring. Also, while the mask 24 is shown as just covering the eyes of the person 14, the mask 24 may be modified to cover part of the face of the person 14 or even the entire face of the person 14.

Hereafter, the person having his/her photo taken may be referred to as the "user" or the "photographic subject" and both terms may be used interchangeably.

As used herein, the SNS may be any social networking system in which photos may be posted. For the purpose of illustration and not limitation, nonlimiting examples of SNSs include Facebook®, YouTube®, WhatsApp®, Instagram®, Tik Tok®, Reddit®, Twitter®, Snapchat® and LinkedIn®.

Figure 2:
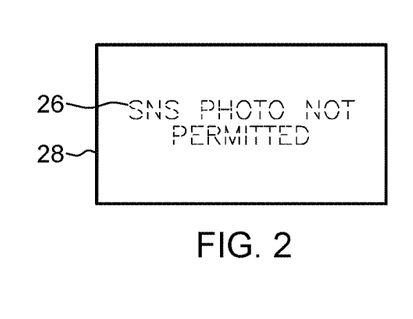
FIGS. 2 and 3 illustrate the invisible indicia on a badge wherein in FIG. 2, the invisible indicia is not visible and in FIG. 3, the invisible indicia is visible when viewed through a near-infrared filter.

FIGS. 2 to 7 illustrate several examples of the invisible indicia. FIG. 2 illustrates invisible ink 26, shown in phantom, on a badge 28. The invisible ink 26 preferably is entirely invisible to the human eye.

Many cameras and smartphones use a charged coupled device (CCD). The CCD reaction frequency band may be about 300~800 nanometers (nm), while the human eye visible band is about 400~700 nm. The near-infrared ink band is about 700~2500 nm. Hence, in case of photos taken using CCDs, the invisible band image of 700~800 nm could be embedded in the photos transferred to an SNS without being visible to the human eye. For the purpose of illustration and not limitation, a suitable ink for the invisible ink of the exemplary embodiments is an infrared ink such as an invisible ink comprising perimidine-based squarylium dyes available from Fuji Xerox.

Figure 3:
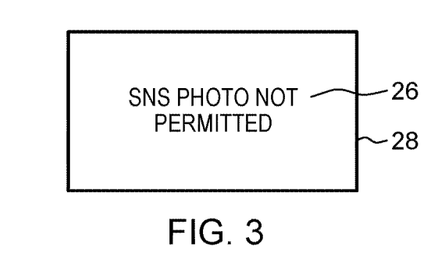

Thus, when a photo is taken, the invisible indicia 26 is not seen by the human eye. However, the invisible indicia 26 may be read by the CCD as shown in FIG. 3. When the invisible indicia 26 is processed by the SNS, the SNS understands that identification of the person and showing of the entire facial image of the person is prohibited, so upon receiving a request or command to share the digital image of the person, the person's face may be altered such as by masking or blurring.

The photos referenced herein are digital photos, also referred to as digital images. It should be understood that the use of the term "photos" encompasses digital photos and digital images.

The indicia may be any markings or letterings and may be embedded or stored in the photo as metadata in, for example, the Exchangeable Image File (EXIF) format. The indicia then may be read and processed by any device that is capable of reading the metadata such as in the EXIF format.

Figure 4:
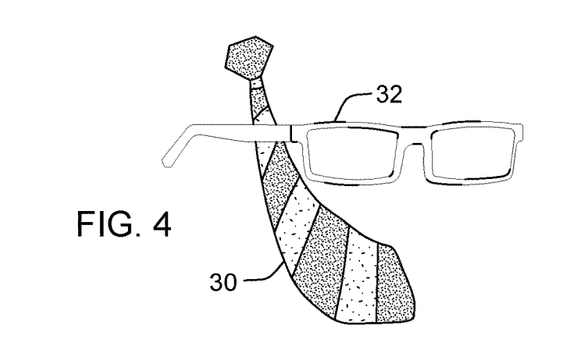
FIGS. 4 and 5 illustrate the invisible indicia on a necktie and glasses wherein in FIG. 4, the invisible indicia is not visible and in FIG. 5, the invisible indicia is visible when viewed through a near-infrared filter.
Figure 5:
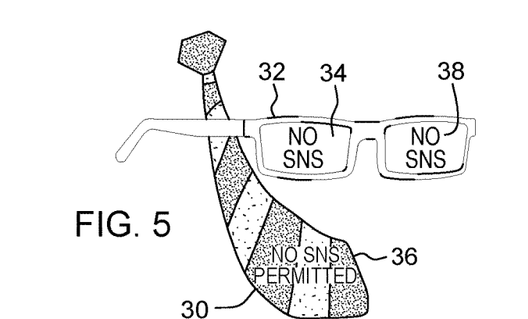

FIGS. 4 and 5 illustrate some articles that may have the invisible indicia. In FIG. 4, there is illustrated a necktie 30 and a pair of glasses 32 in visible light (e.g., wavelength 400-700 nm). FIG. 5 illustrates the necktie 30 and pair of glasses 32 viewed through a near-infrared filter (e.g., 700-2500 nm). The invisible indicia 36 is shown on the necktie 30 and the invisible indicia 38 is shown on the lenses 34 of the pair of glasses 32.

The invisible indicia may be marked on any article that could be photographed with a photographic subject's face. For example, some articles may include article decorations, ornaments, clothes (e.g., shirts, jackets, collars), badges, neckties, glasses, hairpins or broaches. Further, the invisible indicia may be placed directly on the photographic subject's face or body such as by a temporary tattoo, make up or any cosmetic product.

Figure 6:
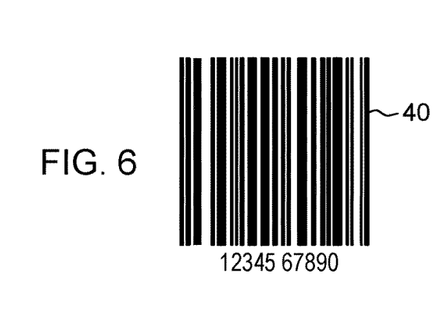
FIG. 6 illustrates the invisible indicia may take the form of a bar code.
Figure 7:
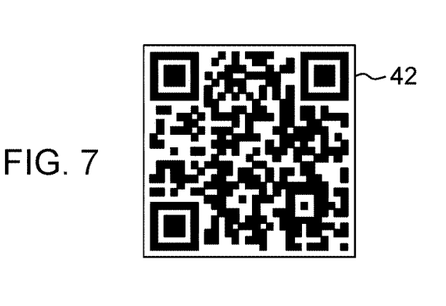
FIG. 7 illustrates the invisible indicia may take the form of a QR code.

The invisible indicia may also be in a form different from lettering. FIG. 6 illustrates invisible indicia in the form of a bar code 40 while FIG. 7 illustrates the invisible indicia in the form of a QR code 42. The bar code 40 and QR code 42 in FIGS. 6 and 7 are shown as they would appear viewed through a near-infrared filter. In visible light, the bar code 40 and QR code 42 would not be seen by the human eye.

In one exemplary embodiment, the photographic subject may wear a physical article which may have an on/off mechanism to switch the invisible indicia on or off. For example, if the photographic subject does not care if the photo is uploaded to an SNS, the switch on the physical article may be in the off position so that any photo would show the photographic subject's face unaltered. Alternatively, if the photographic subject does care if the photo is uploaded to an SNS, the switch on the physical article may be in the on position so that any photo would show the photographic subject's face altered.

Figure 8:
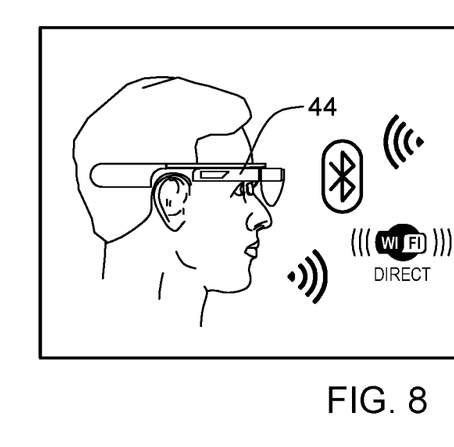
FIG. 8 illustrates an exemplary embodiment in which a physical article may be worn that may have an on/off mechanism wirelessly activated to switch the invisible indicia on or off.
Figure 9:
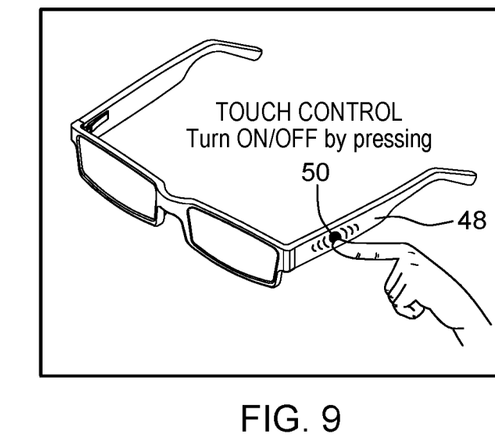
FIG. 9 illustrates an exemplary embodiment in which a physical article may be worn that may have an on/off mechanism manually activated by a switch to switch the invisible indicia on or off.

In FIGS. 8 and 9, for the purpose of illustration and not limitation, the physical article is a pair of sunglasses 44. Other articles would be considered to be within the scope of the exemplary embodiments. In FIG. 8, the sunglasses 44 may be, for example, WiFi-enabled or Bluetooth® wireless technology-enabled, and the on/off mechanism may be operated remotely by, for example, a smartphone 46. In FIG. 9, the on/off mechanism of the sunglasses 48 may be enabled by pressing a switch 50 on the sunglasses 48.

Figure 10:
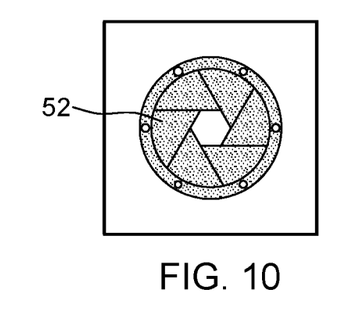
FIGS. 10 and 11 illustrate a mechanism to switch the invisible indicia on or off in which in FIG. 10, the invisible indicia is enabled and in FIG. 11, the invisible indicia is disabled.
Figure 11:
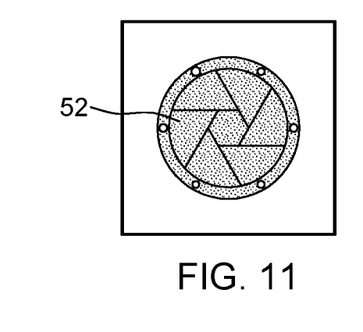

FIGS. 10 and 11 illustrate one mechanism for turning the invisible indicia on or off. In FIG. 10, a shutter 52 on the sunglasses 44, 48 is open to show or enable the invisible indicia. In FIG. 11, the shutter 52 on the sunglasses 44, 48 is closed to disable the invisible indicia.

Figure 12:
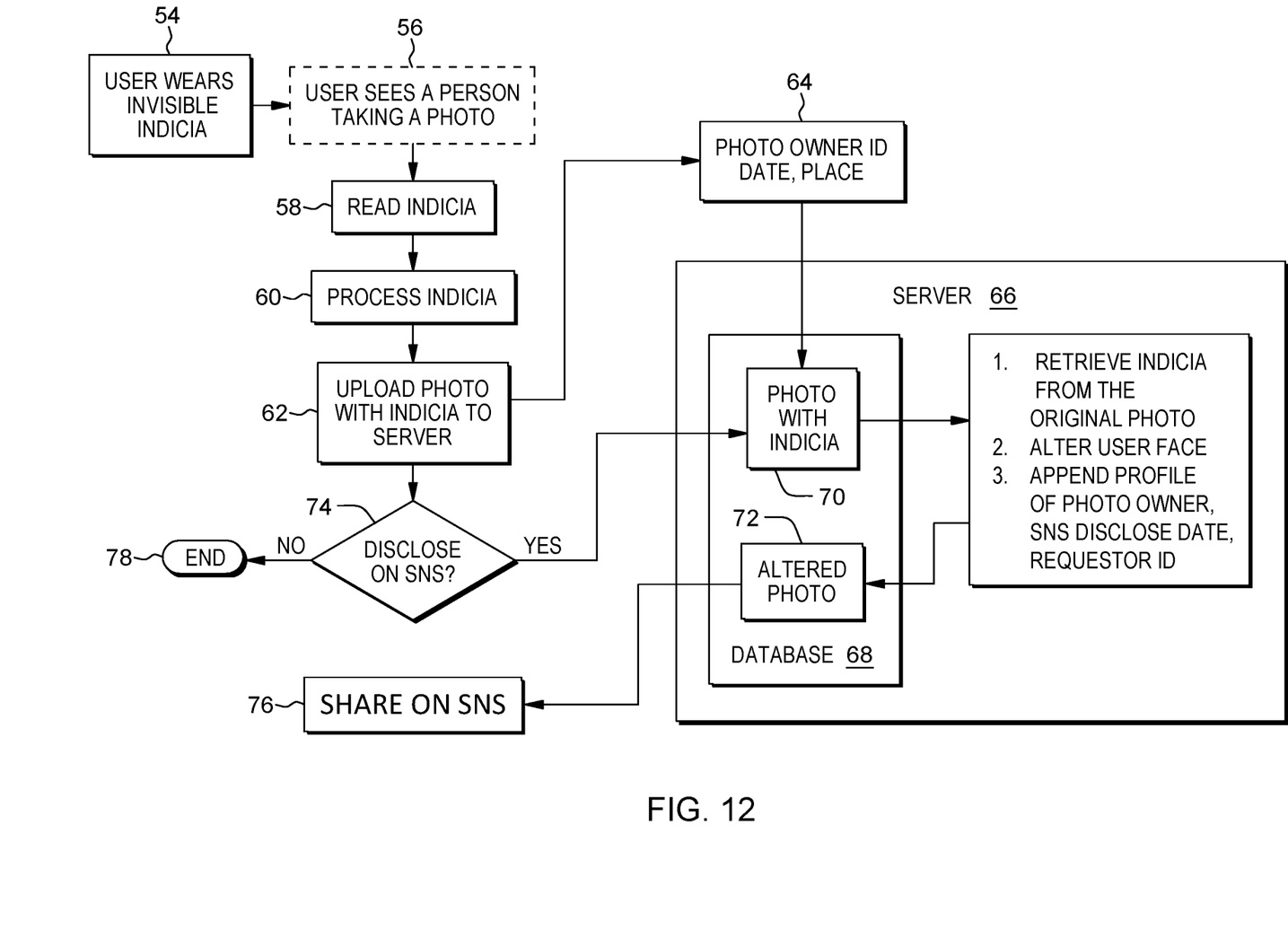
FIG. 12 illustrates one exemplary embodiment of a method of prohibiting personal information identification of a photographic subject.

One exemplary embodiment of a method of prohibiting personal information identification of a photographic subject is illustrated in FIG. 12. The photographic subject, or user, may wear an invisible indicia, box 54. The invisible indicia may be any of the invisible indicia described previously and may be on an article or directly on the photographic subject's face.

The user may see a person photographing the user without the user's permission, box 56. This is optional, as indicated by the dashed lines. The method is functional even if the user does not see the person photographing the user.

The taken photo having the embedded invisible indicia is read, box 58, and then processed, box 60. The read step is to translate the invisible indicia into a form that a computing device can understand. For example, if the invisible indicia is in the form of metadata in the format of EXIF, the device that reads the invisible indicia should be able to read EXIF. The process step is to understand what the invisible indicia says and thereafter make a determination when the invisible indicia prohibits identification of personal information of the photographic subject. When the invisible indicia is in the form of metadata in the format of EXIF, the processing device should be able to understand that the metadata read from EXIF means, for example, that the subject person identified in the EXIF prohibits his/her face being shown. This would include prohibiting the displaying of the user's face without alteration. While the read step and process step are listed as separate steps, it is within the scope of the exemplary embodiments to combine the read and process steps into one step by one device.

Thereafter, the photo with the metadata/invisible indica is uploaded to a server. Either the camera or computing device may upload the photo to the server.

With the advancement in electronics, the camera, computing device and server may be combined in one device such as the camera. The computing device may be, for example, a tablet, such as an iPad, in which case the computing device may perform all functions of the camera, computing device and server. The camera and computing device may be combined in, for example, a tablet and then there may be a separate server. It is also within the scope of the exemplary embodiments for each of the camera, computing device and server to be separate devices.

The reading and processing steps may be accomplished in different ways. If the photographer has a smartphone or a digital camera, the invisible indicia may be read by the smartphone or camera and also processed by the smartphone or camera. The photographer's smartphone or camera may not have the application to read and process the invisible indicia, or the photographer may simply choose to not use the smartphone or camera for that purpose. In the latter case, the photo with the embedded invisible indicia may be uploaded to a computing device and read and processed there.

Thereafter, the photo with the metadata/invisible indicia is uploaded to a server, box 62. Either the camera or computing device may upload the photo to the server.

When the photo is uploaded to the server, certain data may be appended to the invisible indicia, box 64. This data may include, for example, the identification of the owner of the photo which is usually the photographer, and the date and place of the photo.

The server 66 is illustrated in FIG. 12. The server 66 may have a database 68 for, among other things, storing the uploaded photo with the invisible indicia 70 as well as an altered photo 72 when the photo is requested for disclosing on the SNS.

A request may be made to disclose the photo 70, box 74. If the request is to disclose the photo 70 on the SNS, the "YES" path is followed and the request is processed by the server 66. The server 66 may retrieve the invisible indicia from the original photo in database 68 in order to identify the photographic subject (user) of the photo who may need the face altered. The user's face may be altered to result in the altered photo 72 in database 68. As noted before, the altering of the user's face may be by, for example, masking or blurring. Lastly, the SNS disclose date and identification of the requestor may be appended to the altered photo 72.

Thereafter, the altered photo 72 may be shared on the SNS, box 76.

It should be understood that the foregoing process may be automatic in that when the user wears the invisible indicia, any photo taken of the user will, automatically and without input from the user, include the prohibition of the identification of the user and the prohibition against showing the user's face unaltered when the photo is uploaded to an SNS.

If there is no request to disclose the photo on the SNS, the "NO" path may be followed and the process may end, box 78. It is also within the scope of the exemplary embodiments to download the unaltered photo 70 to the user's community if the user wishes to share the photo with friends, family, etc. Even if the unaltered photo 70 is downloaded to the user's community, the invisible indicia would still be appended to the unaltered photo so that if the unaltered photo 70 is attempted to be uploaded to an SNS, the prohibition against identification of the user and showing the user's face unaltered would still apply.

Figure 13:
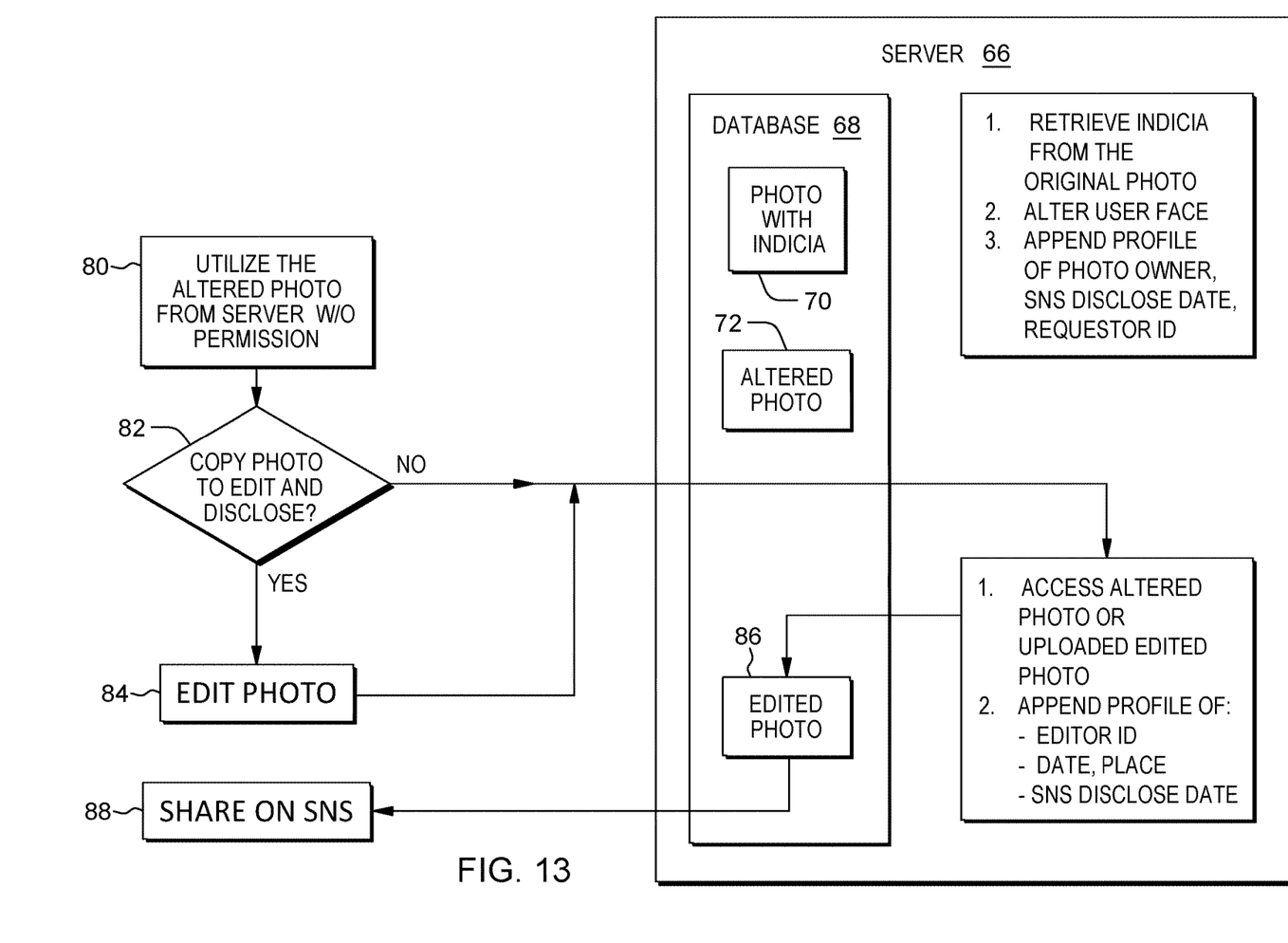
FIG. 13 illustrates one exemplary embodiment in which a third person would like to download and utilize a photo of the user with the user's face altered.

Referring now to FIG. 13, there is one exemplary embodiment in which a third person would like to download and utilize the altered photo 72. The third person is to utilize the altered photo 72 without permission of the user, box 80.

Will the third person copy the photo to edit and disclose on the SNS, box 82? If the answer is no, the "NO" path is followed, then the third person just uploads the altered photo 72 to the server 66 directly without editing. This accounts for the situation where a third person may get access to the altered photo 72 and uploads using their username.

If the answer is yes, the "YES" path is followed. The altered photo 72 is to be edited, box 84. The third party accesses the altered photo 72, or perhaps even a previous edited photo. The photo may be edited to edit details of the photo but the previous prohibitions to not identify the user and to not show the user's face still apply. The edited photo 86 is appended with the profile of the editor, the date and place of editing and the date the photo will be disclosed on the SNS and uploaded to the server 66 and stored in database 68.

The edited photo may then be shared on the SNS, box 88. Again, the previous prohibitions to not identify the user and to not show the user's face still apply.

Figure 14:
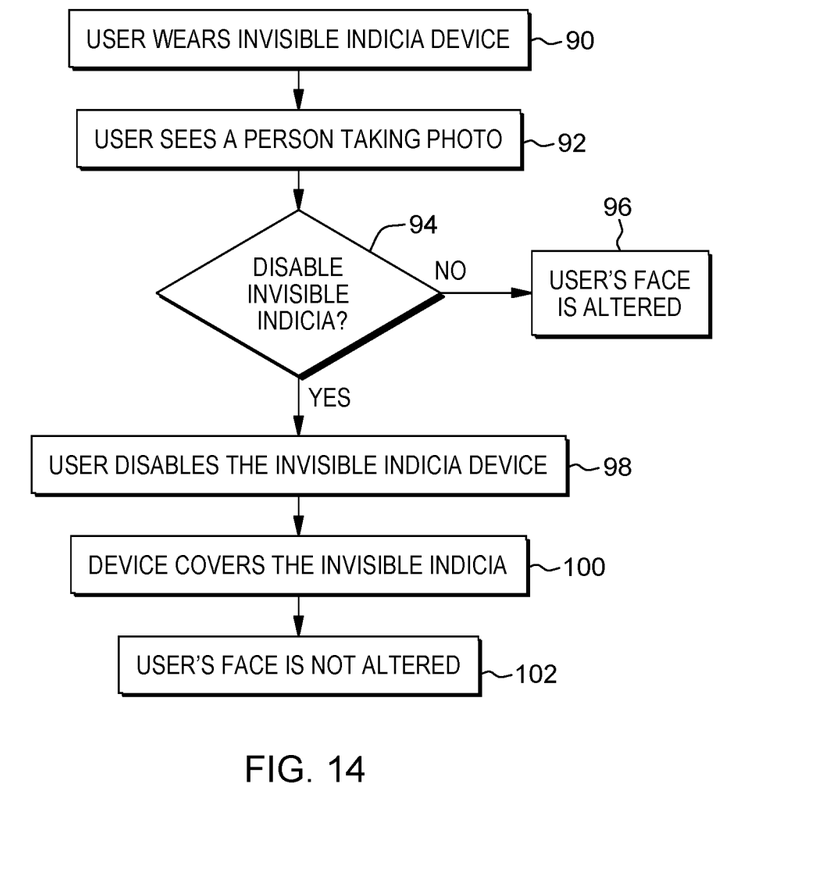
FIG. 14 illustrates one exemplary embodiment of a method for utilizing a device in which the invisible indicia may be turned on or off.

Referring back to FIGS. 8 to 11, the invisible indicia may be turned on or off. FIG. 14 illustrates an exemplary embodiment of a method for utilizing a device in which the invisible indicia may be turned on or off.

The user wears the invisible indicia device that may be turned on or off, box 90.

The user sees a photographer taking a photo, or may be about to take a photo, of the user, box 92.

The user decides whether to disable the invisible indicia, box 94. If the answer is no, the "NO" path is followed and the user's face in the photo will be altered, box 96, if the photographer takes the photo.

If the user decides to disable the invisible indicia, the "YES" path is followed. The user disables the invisible indicia device, box 98.

The invisible indicia is covered, box 100, for example by the shutter illustrated in FIGS. 10 and 11.

Thereafter, when the photographer takes the photo, the user's face is not altered, box 102.

The process described with respect to FIG. 14 assumes that the user does not want his/her photo taken unless the user agrees. In this context, the invisible indicia will always be enabled. It is within the scope of the exemplary embodiments that the user may be in an environment in which the user may want his/her photo taken and shared on the SNS. In this case, the invisible indicia device will be disabled such that a photo of the user will show the user's face unaltered.

However, the user will always have the option to enable the invisible indicia device should the user desire to protect her identity.

Another exemplary embodiment pertains to a system of prohibiting personal information identification of a photographic subject. The system may include a non-transitory storage medium that stores instructions and at least one processor that executes the instructions to:

form a photo of a photographic subject, the photographic subject having an indicia incorporated in the photo indicating prohibiting personal information identification of the photographic subject, the indicia being invisible to the human eye;

read the indicia;

process the indicia to make a determination when the indicia prohibits identification of personal information of the photographic subject; and disclose on a social network system the photo and the personal information of the photographic subject according to the determination.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of prohibiting personal information identification of a photographic subject comprising:
   digitally photographing the photographic subject to form a photo of the photographic subject, the photographic subject having an indicia enabled with a shutter in an open position on a wearable device associated with the photographic subject incorporated in the photo indicating prohibiting personal information identification of the photographic subject, wherein the indicia is invisible to the human eye and a position of the shutter is operated with a secondary device associated with the photographic subject;
   reading the indicia;
   responsive to reading the indicia, processing the indicia to make a determination when the indicia prohibits identification of personal information of the photographic subject; and
   disclosing on a social network system the photo and the personal information of the photographic subject according to the determination.

2. The method of claim 1 wherein the indicia contains metadata that is stored with the photo, the metadata identifying the photographic subject and the personal information identification prohibition.

3. The method of claim 1 wherein reading the indicia and processing the indicia is by a camera that is photographing the photographic subject.

4. The method of claim 3 further comprising uploading by the camera the photo with the indicia to the social network.

5. The method of claim 1 wherein between photographing the photographic subject and reading the indicia, further comprising uploading the photo with the indicia to a computing device and after reading the indicia by a computing device and after processing the indicia by the computing device, uploading the photo with the indicia to the social network.

6. The method of claim 1 wherein when the determination is that the indicia prohibits identification of personal information of the photographic subject, altering the photo of the photographic subject and blocking identification of the photographic subject.

7. The method of claim 6 wherein altering the photo is masking the face of the photographic subject.

8. The method of claim 6 wherein altering the photo is blurring the face of the photographic subject.

9. The method of claim 1 wherein when the determination is that the indicia does not prohibit identification of personal information of the photographic subject, displaying the photo of the photographic subject unaltered.

10. The method of claim 1 wherein the indicia comprises an ink that has high absorbability of light in the wavelength range of 700 to 2500 nm.

11. A computer program product for prohibiting personal information identification of a photographic subject, the computer program product comprising a computer readable storage medium having program instructions embodied therewith, wherein the computer readable storage medium is not a transitory signal per se, the program instructions executable by a processor to cause the processor to perform a method comprising:
   digitally photographing the photographic subject to form a photo of the photographic subject, the photographic subject having an indicia enabled with a shutter in an open position on a wearable device associated with the photographic subject incorporated in the photo indicating prohibiting personal information identification of the photographic subject, wherein the indicia is invisible to the human eye and a position of the shutter is operated with a secondary device associated with the photographic subject;
   reading the indicia;
   responsive to reading the indicia, processing the indicia to make a determination when the indicia prohibits identification of personal information of the photographic subject; and
   disclosing on a social network system the photo and the personal information of the photographic subject according to the determination.

12. The computer program product of claim 11 wherein the indicia contains metadata that is stored with the photo, the metadata identifying the photographic subject and the personal information identification prohibition.

13. The computer program product of claim 11 wherein the indicia comprises an ink that has high absorbability of light in the wavelength range of 700 to 2500 nm.

14. The computer program product of claim 11 wherein reading the indicia and processing the indicia is by a camera that is photographing the photographic subject.

15. The computer program product of claim 14 further comprising uploading by the camera the photo with the indicia to the social network.

16. The computer program product of claim 11 wherein between photographing the photographic subject and reading the indicia, further comprising uploading the photo with the indicia to a computing device and after reading the indicia by a computing device and after processing the indicia by the computing device, uploading the photo with the indicia to the social network.

17. The computer program product of claim 11 wherein when the determination is that the indicia prohibits identification of personal information of the photographic subject, altering the photo of the photographic subject and blocking identification of the photographic subject.

18. The computer program product of claim 17 wherein altering the photo is masking the face of the photographic subject.

19. The computer program product of claim 17 wherein altering the photo is blurring the face of the photographic subject.

20. The computer program product of claim 11 wherein when the determination is that the indicia does not prohibit identification of personal information of the photographic subject, displaying the photo of the photographic subject unaltered.

\* \* \* \* \*